2,960,471

FERROMAGNETIC MATERIALS AND METHODS OF PREPARING THE SAME

Evert Willem Gorter, Eindhoven, Netherlands, assignor, by mesne assignments, to North American Philips Company, Inc., New York, N.Y., a corporation of Delaware No Drawing. Filed Jan. 23, 1957, Ser. No. 635,614

Claims priority, application Netherlands Jan. 24, 1956

12 Claims. (Cl. 252—62.5)

My invention relates to ferromagnetic materials and methods of preparing the same.

In U.S. Patent 2,762,777, a new class of permanent magnets are disclosed which consist essentially of materials having the composition $MFe_{12}O_{19}$ in which M is a metal selected from the group consisting of Ba, Sr and Pb and in which up to 40 atomic percent of one of said metals may be replaced by Ca. These materials are further characterized by a hexagonal crystal structure, namely the crystal structure of the mineral "magnetoplumbite."

I have unexpectedly found a closely-related class of compounds having the same crystal structure, but whose composition differs from the aforesaid composition by the replacement of parts of the iron by titanium and cobalt in the crystal lattice. These compounds are decidedly ferromagnetic and are further characterized by permeabilities which are higher than those of the aforesaid materials and often higher than 2 at frequencies of 50 mc./sec. and even much higher frequencies. These materials are also characterized by low losses at those frequencies.

Accordingly, it is a principal object of my invention to provide an entirely new and hitherto unknown class of ferromagnetic materials.

A further object of my invention is to provide a new class of ferromagnetic materials suitable for application at frequencies up to 50 megacycles per second and even higher.

A further object of my invention is to provide a new class of ferromagnetic materials which have high initial permeabilities at frequencies of up to 50 megacycles per second and higher.

A still further object of my invention is to provide a new class of ferromagnetic materials which have low losses at frequencies of up to 50 megacycles and even higher.

These and other objects of my invention will be apparent from the description that follows.

According to my invention I have unexpectedly found that materials having a composition

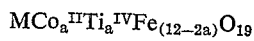

$$MCo_a^{II}Ti_a^{IV}Fe_{(12-2a)}O_{19}$$

wherein M is at least one metal selected from the group consisting of barium, strontium and lead and calcium in an amount up to 40 atom percent of said other metals and $a$ has a value from 1.0 to 1.6 have outstanding ferromagnetic properties particularly at high frequencies. I have further found that these materials have particularly good ferromagnetic properties when $a$ has a value of from 1.2 to 1.45. The materials of my invention have a hexagonal crystal structure equal to that of the mineral "magnetoplumbite."

The materials of my invention are characterized by having low losses and high initial permeabilities at high frequencies even at 50 mc./s. and higher.

The materials of my invention may be manufactured by sintering at a temperature above 1200° C., in an oxidizing atmosphere such as air or oxygen, a finely divided mixture of ferric oxide and the oxides of the other metals necessary to form my materials. In place of the oxides of these metals compounds of these metals which form oxides upon heating such as the acetates, oxalates or carbonates may be used. Alternatively, instead of starting with the simple oxides it is possible to start with previously obtained reaction products of these oxides such as for example $BaFe_{12}O_{19}$ and $SrFe_{12}O_{19}$.

If desired, the finely-divided initial material may be pre-sintered at a comparatively low temperature (about 800° to 1100° C.) in air or oxygen, the reaction product pulverized again and the resultant powder sintered again, which series of treatments may be repeated once more or several times.

Also if desired sintering agents such as silicates and fluorides may be added to the mixture of oxides.

The high-frequency properties of the materials according to the invention may in many cases be considerably improved by ensuring in the manufacture of such materials that the size of the individual crystallites does not become excessive. This may be ensured by thoroughly pulverizing the initial material and preventing any undue crystal growth during sintering. Strong crystal growth may be avoided by utilizing a sintering process, which is comparatively moderate, that is to say in most cases comparatively short. It must be regarded as a surprising circumstance that the high-frequency properties of the materials concerned may be improved in the manner indicated.

Small amounts of impurities such as $Fe_2O_3$ and compounds which have the spinel structure may be present without adversely affecting the magnetic properties of my materials.

Bodies of desired shape may be formed by sintering the starting mixtures directly in the desired shape. Alternatively bodies of desired shape may be formed by regrinding the sintered material of my invention, or the presintered material, molding the resultant powder into the desired shape and sintering the molded product if necessary. A binder such as water, a solution of nitrocellulose or a solution of carboxymethylcellulose may be added to the powdered mixtures before molding if necessary.

In a further embodiment of my invention the finely divided material of my invention is molded to form a body of the desired shape by pressing the relative material together with a binding agent which is capable of being hardened (for example a polyester resin or an ethoxylin resin), followed by hardening the molded body.

My invention will now be described in greater detail with reference to the following examples and table.

EXAMPLE I 39.8 gs. of barium carbonate (69.1% by weight of barium), 31.8 gs. of cobalt carbonate (44.5% by weight of cobalt), 19.3 gs. of titanium oxide (99.9% by weight of $TiO_2$) and 156.8 gs. of ferric oxide (99.6% by weight of $Fe_2O_3$) were mixed. These amounts are chosen so that in the formula given above $a$ had the value 1.2. This mixture was ground in a rotating ball mill with alcohol for 15 hours. After drying, the mixture was presintered at 1100° C. for two hours and again ground in the same manner. Subsequently, the powder was again ground with alcohol in a vibrating ball mill for 4 hours. A ring was then molded from the powder obtained after drying at a pressure of 1.5 tons/cm.² This ring was sintered in oxygen by passing it through an oven. The zone of maximum temperature (1280° C.) which had a length of 10 cms. was traversed in 6 minutes.

EXAMPLE II
($a=1.35$)

39.8 gs. of barium carbonate, 35.8 gs. of cobalt carboate, 21.6 gs. of titanium oxide and 151.9 gs. of ferric oxide were ground in the manner indicated in Example I, presintered and again ground. A ring was molded from the powder obtained and sintered at 1280° C. (ring A) and another ring was molded and sintered at 1350° C. (ring B) both in oxygen, in an oven as indicated in Example I.

EXAMPLE III
($a=1.45$)

39.8 gs. of barium carbonate, 38.4 gs. cobalt carbonate, 23.2 gs. of titanium oxide and 148.6 gs. of ferric oxide were treated similarly as in the previous examples. The final sintering process was effected at 1350° C. in oxygen.

EXAMPLE IV
($a=1.6$)

50.1 gs. of barium carbonate, 52.0 gs. of cobalt carbonate, 32.0 gs. of titanium oxide and 179.6 gs. of ferric oxide were ground in the manner above described and, after drying, the mixture was presintered at 1050° C. for 2 hours and again ground in a rotating ball mill for 15 hours. A ring was molded from the powder obtained at a pressure of 1.5 tons/cm.$^2$, the ring being sintered for 2 hours in a stationary oven at 1320° C. in oxygen and slowly cooled with the oven.

X-ray examination proved that the rings obtained according to these examples consisted of crystals with the crystal structure isomorphic to that of the mineral "magnetoplumbite."

The magnetic properties of the rings obtained according to these examples are tabulated in the following table. In the table $a$ corresponds to the term "$a$" in the formula for the compounds of my invention.

The expression "tan $\delta$" may be explained by the following remarks. A magnetic alternating field of a small amplitude generally produces an almost sinusoidally varying inductance in a ferromagnetic body. Due to the electro magnetic losses, a phase-difference exists between the field strength and the inductance. Consequently, it is common practice to represent the initial permeability of a ferromagnetic body as a complex value. This is expressed by the relation: $\mu=\mu'-j\mu''$. This relation shows that the inductance may be regarded as constituted by two components, of which one is co-phasal with the field applied and the other lags by 90° with respect thereto. The value $\mu'$ is the real portion of the initial permeability and is included in the table. The loss factor tan $\delta$ is given by the formula:

$$\tan \delta = \mu''/\mu'$$

This loss factor "tan $\delta$" is also referred to as the "loss factor" of the ferromagnetic materials.

Table
MAGNETIC PROPERTIES

| Example | $a$ | $\mu'$ low frequency | 83 mc./s. | | 145 mc./s. | | 275 mc./s. | | 500 mc./s. | |
|---|---|---|---|---|---|---|---|---|---|---|
| | | | $\mu'$ | tan $\delta$ | $\mu'$ | tan $\delta$ | $\mu'$ | tan $\delta$ | $\mu'$ | tan $\delta$ |
| I | 1.20 | 19 | 19 | 0.06 | 20 | 0.17 | 20 | 0.5 | | |
| II (ring A) | 1.35 | 19 | 17 | 0.08 | 17 | 0.12 | 18 | 0.4 | | |
| II (ring B) | 1.35 | 45 | 35 | 0.29 | 29 | 0.5 | 25 | 0.6 | | |
| III | 1.45 | 23 | 23 | 0.28 | | | | | | |
| IV | 1.6 | 6.2 | | | | | | | 5.2 | 0.18 |

As can be readily observed from the foregoing table the initial permeability $\mu'$ of the ferromagnetic bodies of my invention remain at high levels even at frequencies of 275 mc./s. and above and the loss factor "tan $\delta$" remains at a relatively low value even at high frequencies.

While I have described my invention in connection with specific embodiments and applications, other modifications thereof will be readily apparent to those skilled in this art without departing from the spirit and scope of the invention as defined in the appended claims.

What is claimed is:

1. Ferromagnetic material consisting essentially of mixed crystals having a composition corresponding to the formula $$MCo_a^{II}Ti_a^{IV}Fe^{III}_{(12-2a)}O_{19}$$

wherein M is at least one metal selected from the group consisting of barium, strontium, lead and $a$ has a value between about 1.0 and 1.6 and having a hexagonal crystal structure isomorphic to that of the mineral "magnetoplumbite," said material having an initial permeability $\mu'$ of at least 2 and a loss factor, tan $\delta$, of less than about 0.6 at frequencies up to 50 mc./s. and higher.

2. The ferromagnetic material of claim 1 in which $a$ in the formula has a value between about 1.2 and 1.45.

3. The ferromagnetic material of claim 1 in which M is barium.

4. The ferromagnetic material of claim 1 in which M is strontium.

5. The ferromagnetic material of claim 1 in which M is lead.

6. The ferromagnetic material of claim 1 in which the metal selected from the group consisting of barium, strontium, and lead is replaced by up to about 40 atom percent of calcium.

7. A method of manufacturing a ferromagnetic material having a high initial permeability, $\mu'$, and a low loss factor, tan $\delta$ at frequencies up to 50 mc./s. and higher comprising the steps, preparing a finely divided mixture of ferric oxide, at least one compound selected from the group consisting of barium oxide, strontium oxide, lead oxide and calcium oxide in an amount corresponding to up to 40 atom percent of calcium for the metals barium, strontium and lead, titanium oxide and cobalt oxide in amounts suitable to form a composition corresponding to the formula $MCo_a^{II}Ti_a^{IV}Fe^{III}_{(12-2a)}O_{19}$ wherein M is at least one metal selected from the group consisting of barium, strontium, lead and calcium in an amount up to 40 atom percent of said latter metals, $a$ has a value of from about 1.0 to 1.6; and sintering said mixture at a temperature of about 1200° C. to about 1350° C. in an atmosphere containing at least as much oxygen as air.

8. The method of claim 7 in which a portion of the oxides are formed during the sintering operation.

9. The method of claim 7 in which part of the oxides used are replaced by previously reacted products between two or more of the oxides.

10. The method of claim 7 in which the finely divided mixture is presintered at a temperature between about 800° C. and 1100° C. before being finally sintered at a temperature above 1200° C.

11. A method of preparing a ferromagnetic body having a high initial permeability, $\mu'$, and a low loss factor, tan $\delta$ at frequencies up to 50 mc./s. and higher comprising the steps, preparing a finely divided mixture of ferric oxide, at least one compound selected from the group consisting of barium oxide, strontium oxide, lead oxide and calcium oxide in an amount corresponding to up to 40 atom percent of calcium for the metals barium, strontium and lead, titanium oxide and cobalt oxide in amounts suitable to form a composition corresponding to the formula $MCo_a^{II}Ti_a^{IV}Fe^{III}_{(12-2a)}O_{19}$ wherein M is at least one metal selected from the group consisting of barium, strontium, lead and calcium in an amount up to 40 atom percent of said latter metals, $a$ has a value of from about 1.0 to 1.6; molding said mixture into a body of desired shape and sintering said body at a temperature of about 1200° C. to 1350° C. in an atmosphere containing at least as much oxygen as air.

12. A method of preparing a ferromagnetic body having a high initial permeability, $\mu'$ and a low loss factor, tan $\delta$, at frequencies up to 50 mc./s. and higher comprising the steps, preparing a finely divided mixture of ferric oxide, at least one compound selected from the group consisting of barium oxide, strontium oxide, lead oxide and calcium oxide in an amount corresponding to up to 40 atom percent of calcium for the metals barium, strontium and lead, titanium oxide and cobalt oxide in amounts suitable to form a composition corresponding to the formula $MCo_a^{II}Ti_a^{IV}Fe^{III}_{(12-2a)}O_{19}$ wherein M is at least one metal selected from the group consisting of barium, strontium, lead and calcium in an amount up to 40 atom percent of said latter metals, $a$ has a value of from about 1.0 to 1.6; pre-sintering said mixture at a temperature between about 800° C. and 1100° C., regrinding the sintered material, molding said regrinded material into a body of desired shape and sintering said body at a temperature of about 1200° C. to about 1350° C. in an atmosphere containing at least as much oxygen as air.

References Cited in the file of this patent

UNITED STATES PATENTS

| | | |
|---|---|---|
| 2,656,319 | Berge | Oct. 20, 1953 |
| 2,736,708 | Crowley | Feb. 28, 1956 |
| 2,762,777 | Went et al. | Sept. 11, 1956 |
| 2,762,778 | Gorter et al. | Sept. 11, 1956 |

FOREIGN PATENTS

| | | |
|---|---|---|
| 150,217 | Australia | Feb. 23, 1953 |
| 514,251 | Canada | June 28, 1955 |

OTHER REFERENCES

Romeijn: Philips Research Reports, vol. 8, p. 330, October 1953.

Gorter: Philips Research Reports, vol. 9, pp. 403–418, December 1954.

Phillips Technical Review, vol. 18, No. 6, pp. 145–154.